US 6,654,675 B2

(12) United States Patent
Pedersen et al.

(10) Patent No.: US 6,654,675 B2
(45) Date of Patent: Nov. 25, 2003

(54) DEVICE FOR ATTENUATING THE PITCHING OF AN ENGINE-DRIVEN VEHICLE

(75) Inventors: Søren Pedersen, Sonderborg (DK); Per Nielsen Lindholdt, Sonderborg (DK); Welm Friedrichsen, Nordborg (DK); Asger Flintholm, Augustenborg (DK)

(73) Assignee: Sauer-Danfoss Holding A/S, Nordborg (DK)

( * ) Notice: Subject to any disclaimer, the term of this patent is extended or adjusted under 35 U.S.C. 154(b) by 0 days.

(21) Appl. No.: 10/204,231

(22) PCT Filed: Feb. 28, 2001

(86) PCT No.: PCT/DK01/00136
§ 371 (c)(1),
(2), (4) Date: Aug. 19, 2002

(87) PCT Pub. No.: WO01/65150
PCT Pub. Date: Sep. 7, 2001

(65) Prior Publication Data
US 2003/0014167 A1 Jan. 16, 2003

(30) Foreign Application Priority Data
Mar. 1, 2000 (DE) .......................................... 100 09 924

(51) Int. Cl.⁷ ................................................. G06F 7/00
(52) U.S. Cl. ........................................ 701/36; 701/38
(58) Field of Search ........................... 701/101, 36, 70, 701/38, 71, 99; 280/55

(56) References Cited

U.S. PATENT DOCUMENTS

| 5,183,127 A | * | 2/1993 | Kageyama et al. ......... 180/197 |
| 5,195,864 A | | 3/1993 | Drake et al. |
| 5,232,242 A | * | 8/1993 | Bachrach et al. ........... 280/707 |
| 5,544,715 A | * | 8/1996 | Phillips ...................... 180/417 |
| 5,572,425 A | * | 11/1996 | Levitt et al. ................ 280/707 |
| 5,897,287 A | | 4/1999 | Berger et al. |

FOREIGN PATENT DOCUMENTS

| DE | 197 54 828 C2 | 6/1999 |
| EP | 0 518 226 A1 | 12/1992 |

* cited by examiner

Primary Examiner—Richard M. Camby

(57) ABSTRACT

The invention relates to a device for damping the pitching of an engine-driven vehicle with a chassis and axles 5, at least one of which is mounted fixedly on the chassis. The aim of the invention is to provide a simplified corresponding device. To this end, the torque of at least one wheel borne on the axles (5) is influenced on the basis of the size of the pitching in such a way that the pitching. is damped.

8 Claims, 2 Drawing Sheets

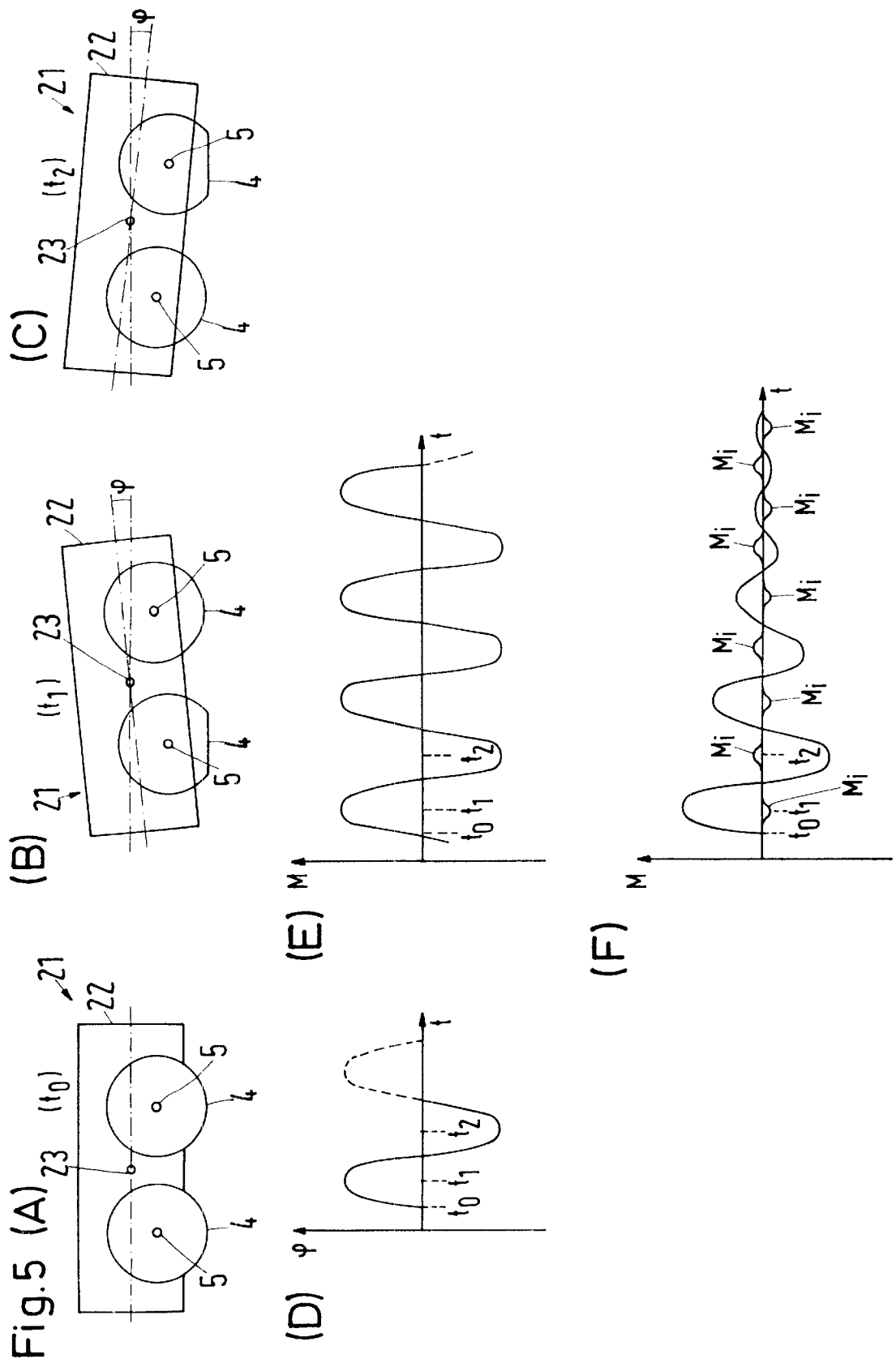

DEVICE FOR ATTENUATING THE PITCHING OF AN ENGINE-DRIVEN VEHICLE

CROSS REFERENCE TO RELATED APPLICATIONS

This application is the U.S. national phase application of International Application No. PCT/DK01/00136 filed Feb. 28, 2001 which claims priority of German (DE) Application No. 100 09 924.6, which are incorporated in their entirety by reference made herein.

FIELD OF THE INVENTION

The invention concerns a device for damping the pitching of an engine-driven vehicle with a chassis and axles, of which at least one is fixed rigidly on the chassis, and with flexible tyres.

BACKGROUND OF THE INVENTION

In connection with vehicles having axles mounted fixedly (unflexibly) on the chassis, like construction machines, forest machines, agricultural machines, skid-steered loaders, caterpillar tractors with pneumatic tyres and similar vehicles, the upper part of the vehicle, when driving, usually performs pitching, that is, oscillating movements, around an axis, which is parallel to the axles. The frequency and the amplitude of the pitching depend on the speed and the load of the vehicle.

The reason for the pitching is that the axles are mounted fixedly on the vehicle chassis, meaning that the only flexibility comes from the pneumatic tyres.

In order to damp the pitching of a vehicle with a working device operated by a hydraulic cylinder, it is known either to insert a cushion for the boom cylinder in the hydraulic system (U.S. Pat. No. 5,195,864) or to control the oil supply to the hydraulic cylinder and thus also the. relative position of the working device (U.S. Pat. No. 5,897,287). In order to dampen the pitching of a tractor, for example when driving in the roads with a mounted plow, it is further known (EP 0 518 226 A1) to provide the front axle with an active damping in the form of a damping cylinder, which counteracts the pitching.

Influencing the steering of the working device in order to remedy pitching would also influence the desired movement of the working device during operation. The insertion of an additional damping cylinder is expensive.

It is therefore a principal object of this invention to provide a device for damping the pitching of an engine driven vehicle, which does not require influences on the steering of a possible working device, and which has a simple design.

A further object of the invention is to influence the torque on at least one of the wheels supported on the axles, is influence by a measure of the pitching of the vehicle in such a way that the pitching is dampened.

These and other objects will be apparent to those skilled in the art.

SUMMARY OF THE INVENTION

A device for damping the pitching of an engine-driven vehicle with a chassis and axles, of which.at least one axle is mounted fixedly on the chassis, and with flexible tires, characterised in that the torque of at least one of the wheels (4) supported on the axles (5) is influenced in dependence of a measure of the pitching of the vehicle (21) in such a way that the pitching is damped.

BRIEF DESCRIPTION OF THE DRAWINGS

FIGS. 5A–5C are schematic views of a vehicle, whose upper part performs pitching, and FIGS. 5D–5F are various curved diagrams illustrating the idea of the invention.

DESCRIPTION OF THE PREFERRED EMBODIMENT

Figure 1:
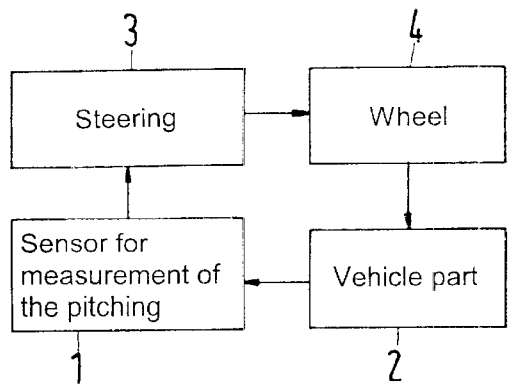
FIG. 1 is a block diagram of the principal design of a device according to the invention.

According to FIG. 1, a sensor 1 provides a measurement of the pitching of a vehicle part 2 of a vehicle with a chassis and axles, of which at least one is mounted fixedly on the chassis, and which has flexible tires, preferably pneumatic tires, and in dependence of the output signal of the sensor 1. The torque of at least one wheel 4 of the wheels supported on the axles is influenced by a steering 3 in such a way that the pitching is damped.

This is based on the knowledge that during braking the upper part of a vehicle endeavours to perform a movement in the travelling direction in relation to the axles, and during acceleration it endeavours to perform the opposite movement. Each of these movements also corresponds to a half cycle of a pitching movement. When increasing the torque of at least one wheel in the travelling direction during a half cycle of a pitching movement in the travelling direction, and vice versa, each half cycle of a pitching movement can be damped, until all pitching movements have substantially subsided.

For this purpose, a measure of the pitching is determined. For example, one of the following entities can be used as measure of the pitching: the operating pressure of at least one hydraulic engine driving at least one of the axles, the torque of at least one electric or combustion engine driving at least one of the axles, the pressure or the piston position in a working cylinder, particularly the boom cylinder, of a working device mounted on the vehicle, the tire pressure, and the angular acceleration of a vehicle part around the pitching axis.

In dependence of the measure of the pitching, the torque of at least one of the.wheels is changed with the purpose of damping the pitching, for example, by influencing the torque of a driving engine of at least one axle or the operating voltage or the operating frequency of an electric driving engine of at least one axle or the gear ratio of a gear transmission between driving engine and axle or several driving engines and axles, or the braking power of at least one brake of a braking system of the vehicle.

Figure 2:
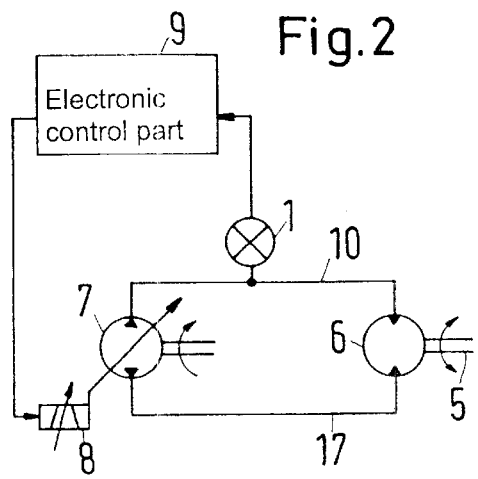
FIG. 2 is a more detailed schematic view of an embodiment of a device according to the invention.

FIG. 2 shows a schematic view of a first example of determining the measure of pitching and the influencing of the torque of a driven wheel. The wheel, not shown in, FIG. 2, is mounted unrotatably on an axle 5, which can be driven by a hydraulic engine 6 with two flow directions. A hydraulic pump 7 with variable displacement volume and two flow directions, which is driven by a combustion engine (not shown), controls the driving pressure of the hydraulic engine 6. The displacement volume of the pump 7 is determined by an electromagnetic regulating unit 8 in dependence of a control signal of an electronic control part (FIG. 3) of the steering control 3, which converts the measuring signal of a sensor 1, converting the pressure in a line 10 (FIG. 3) connecting the hydraulic engine 6 and the hydraulic pump 7, into the control signal of the regulating unit 8. For example, the control signal of the regulating unit 8, generated via the electronic control part 9, can represent the amplitude of a pitching or the angle acceleration of the vehicle part 2, as the pressure in the line 10 is a measure of the oscillation width of the pitching, that is, the angle of the rotary movement of the upper vehicle part around the pitching axis, lying between the axles, above their common level and parallel to the axles. On the basis of this oscillation angle or rotary angle of the upper vehicle part, the angle speed or angle acceleration can then be calculated in the electronic control part 9. The control signal of the control part 9 then adjusts the displacement of the hydraulic pump in each half wave of the pitching in such a way that the change of the pressure in the line 10, caused by this adjustment, is directed opposite to the change of the pressure in line 10 occurring during each half wave of the pitching. In other words, when the pressure in the line 10 increases because of a half wave of the pitching, the electronic control part 9 causes a reduction of the displacement of the hydraulic pump 7 via the regulating unit 8, and when the pressure in the line 10 is reduced by the following, oppositely directed half wave of the pitching, the pressure in the line 10 is increased via the hydraulic pump 7. Thus, in the cause of a few oscillations, the pitching is substantially damped.

Figure 3:
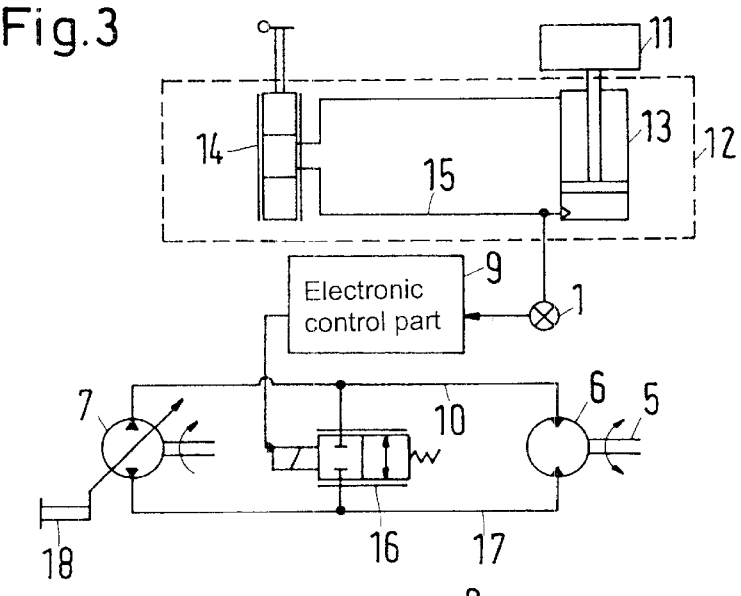
FIG. 3 is a more.detailed schematic view of another embodiment of a device according to the invention.

In the embodiment according to FIG. 3, parts corresponding to those in FIG. 2 have the same reference numbers. The vehicle is provided with a working device 11, which again is provided with a working cylinder 13 for activating the working device 11 and a directional control valve 14 for the manual control of.the working cylinder 13 via a hydraulic control part 12. On a line 15, which connects the working cylinder 13 with the directional control valve 14, which is connected with a hydraulic pump (not shown), the sensor 1 is connected. In the electronic control part 9, the electric output signal of the sensor 1 is converted to an electric control signal for a throttling electromagnetic 2/2-way valve 16, which is connected between the lines 10 and 17 connecting the hydraulic engine 6 with the hydraulic pump 7. The displacement of the hydraulic pump 7 and the flow direction in the hydraulic pump 7 are adjustable by a manually operated regulating unit 18. When the upper vehicle part 2 performs pitching, this usually also causes pressure fluctuations in the line 15, particularly when the working device 11 is a heavy device, for example a digging tool for a backhoe. These pressure fluctuations are again measured by the sensor 1 and converted by the electronic control part 9 into an electrical control signal for the 2/2-way valve 16. A pressure increase in the line 15, which also causes a pressure increase in the line 10, will switch the 2/2-way valve 16 from the shown locked position to the open position for the duration of the pressure increase, so that the hydraulic pump 7 and the hydraulic engine 6 are short-circuited. Thus, also the pressure in the hydraulic engine 6 is decreased, so that a pressure equalising is achieved. A pressure drop in the lines 10 and 15, caused.by a pitching half wave in the opposite direction, will switch the 2/2-way valve back into the locked position and increase the pressure in the line 10 by means of the hydraulic pump 7, so that also with this embodiment the pitching will subside after a short while.

Figure 4:
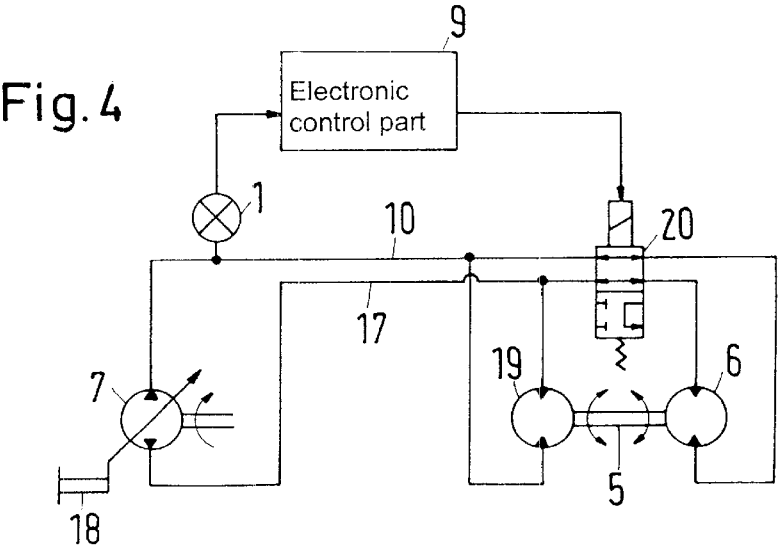
FIG. 4 is a more detailed schematic view of a further embodiment of a device according, to the invention.

In the embodiment according to FIG. 4, the parts corresponding to those in the preceding embodiments have the same.reference numbers. The embodiment according to FIG. 4 differs from that in FIG. 1 in that instead of one hydraulic engine 6, it has an additional hydraulic engine 19 driving the same axle 5 and that an electromagnetically activated 4/2-way valve 20 is connected between the lines 10 and 17. When the pressure in the line 10 varies due to pitching, which is transferred to the axle 5 and from there to the pressure in the line 10 via the hydraulic engines 6, 19, the electronic control part 9 will, in the case of an increase in the pressure, cause a switching of the 4/2-way valve from the open position shown to the closed position, in which the hydraulic engine 6 is turned off, and only the hydraulic engine 19 is on. Accordingly, the torque transferred to the axle 5 is reduced. The pressure drop in the line 10 during the next half wave of the pitching will switch the 4/2-way valve back to the open position shown, causing the torque on the axle 5 and thus also the torque on the wheel on this axle 5 to increase. This process is repeated until after a short while the pitching has substantially subsided.

By means of different schematic views of a vehicle 21 (FIGS. 5(A) to 5(C)), whose upper part 22 performs pitching around a transversal axis 23, and a diagram (FIG. 5(D)) of the pitching angle $\phi$ without damping of the upper part 22 of the vehicle 21 at different times, $t_0$, $t_1$, and $t_2$ in dependence of the time t, FIG. 5 shows, in FIG. 5(E), the undamped oscillations of the torque M of, for example, the axis 5 and the wheel 4 fitted on said axis, corresponding to the oscillations of the rotating angle $\phi$, and, in FIG. 5(F), the damped oscillations of the torque M of the axle 5 and the wheel 4 fitted on said axle, which result from the short, small torque impulses $M_i$ effected in each half wave of the oscillations of the torque M according to FIG. 5(E), by the device according to the invention, in the opposite direction of the oscillation half waves caused by the pitching. The torque impulses $M_1$ compensating the torque oscillations cause an eventual subsiding of the oscillations of the torque M or the pitching, respectively, to a small remaining oscillation width.

When a longer duration of the subsiding of the pitching is permissible or sufficient, the compensating (oppositely directed) torque impulses $M_1$can also be affected only.in every second half wave of the pitching.

Further variations of the embodiments shown could be, for example, that, instead of the hydraulic control part for the axle or for the wheel 4 fitted on said axle, respectively, an electrical driving engine with controllable, torque, for example a brushless d.c.-engine, whose torque is measured by a sensor and is controlled by means of a control part, for example with an inverter, whose output voltage or frequency is controllable by means of the output signal of the sensor, in such a way that pitching is damped.

Accordingly, alsothe gear ratio of a gear transmission between driving engine and axle, for example when using a combustion engine, can be changed in such a way that the pitching is damped.

Further, it is possible to change the braking force of at least one brake in a braking system of the vehicle in dependence of the size of the pitching in such a way that the pitching is damped.

With vehicles, such as backhoe or surface excavators, whose wheels, arranged on either side of the vehicle, are driven by their own engine via a chain drive, for example a skid steered loader, each of the two driving engines can also be controlled in dependence of the size of the pitching in such a way that the pitching is damped.

Preferably, it is ensured that one of the following entities serves as measure of the pitching:

the operating pressure of at least one hydraulic engine driving at least one of the axles, the torque of at least one electric or combustion engine driving at least one of the axles, the pressure or the piston position in a working cylinder, particularly the boom cylinder, of a working device mounted on the vehicle, the tyre pressure, or the angular acceleration of a vehicle part around the pitching axis.

Thus, the torque of at least one of the wheels can be influenced by a change of the torque of a driving engine of at least one axle, the operating voltage or the operating frequency of an electric driving engine of at least one axle, the gear ratio of a gear transmission between driving engine(s) and axle(s) or the braking power of at least one brake of a braking system of the vehicle.

Thus, it is seen that this invention will achieve at least all of its stated objectives.

What is claimed is:

1. A device for damping the pitching of an engine driven vehicle having a chassis with axles, of which at least one axle is mounted fixedly on the chassis, and with wheels mounted on the axles having tires comprising:

a pitch detecting device mounted to the chassis;

a control means for controlling the wheel speed operably connected to the pitch detecting device; and said control means operably connected to the wheels of the chassis.

2. The device of claim 1 where in the pitch detecting device detects pitch from the operating pressure of at least one hydraulic engine driving at least one of the axles.

3. The device of claim 1 wherein the pitch detecting device detects pitch from the torque of an engine driving at least one of the axles.

4. The device of claim 1 wherein the pitch detecting device detects pitch from a piston position in a working boom cylinder.

5. The device of claim 1 wherein the pitch detecting device detects pitch from the pressure of at least one tire.

6. A device for damping the pitching of an engine-driven vehicle having a chassis with axles, of which at least one axle is mounted fixedly on the chassis, and with wheels mounted on the axles having tires comprising:

an electronic pitch sensing device mounted onto the chassis;

a hydraulic pump operably connected the electronic sensing device so as to receive signals from the electronic sensing device; and a hydraulic engine operably connected and controlled by the hydraulic pump and operably connected to the wheels of the chassis.

7. A device for damping the pitching of an engine-driven vehicle having a chassis with axles, of which at least one axle is mounted fixedly on the chassis, and with wheels mounted on the axles having tires comprising:

an electronic pitch sensing device mounted onto the chassis;

a hydraulic pump operably connected the electronic sensing device so as to receive signals from the electronic sensing device;

a 2/2-way valve operably connected to the hydraulic pump;

a hydraulic engine operably connected to the 2/2-way valve so that a hydraulic circuit is formed can be opened when the pressure in the 2/2-way valve reaches a threshold value; and said hydraulic engine operably connected to the wheels of the chassis.

8. A device for damping the pitching of an engine-driven vehicle having a chassis with axles, of which at least one axle is mounted fixedly on the chassis, and with wheels mounted on the axles having tires comprising:

an electronic pitch sensing device mounted onto the chassis;

a hydraulic pump operably connected the electronic sensing device so as to receive signals from the electronic sensing device;

a 4/2-way valve operably connected to the hydraulic pump;

a first hydraulic engine operably connected to the 4/2-way valve;

a second hydraulic engine operably connected to the 4/2-way valve;

said first hydraulic engine, second hydraulic engine, and 4/2-way valve forming a circuit so that when pressure in the 4/2-way valve reaches a threshold value the said first hydraulic engine will be disconnected from the circuit; and said circuit operably connected to the wheels of the chassis.

* * * * *